United States Patent [19]

Kato

[11] Patent Number: 4,558,511
[45] Date of Patent: Dec. 17, 1985

[54] METHOD OF MANUFACTURE OF A MAGNETIC ROTOR CORE MEMBER FOR A ROTATING-FIELD DYNAMOELECTRIC MACHINE

[75] Inventor: Masa Kato, Ibaragi, Japan

[73] Assignee: Kato Iron Works, Ltd., Hitachi, Japan

[21] Appl. No.: 572,994

[22] Filed: Jan. 23, 1984

[30] Foreign Application Priority Data

Apr. 7, 1983 [JP] Japan ................................. 58-059913

[51] Int. Cl.$^4$ ............................................. H02K 15/02
[52] U.S. Cl. ........................................ 29/598; 72/377
[58] Field of Search ..................... 29/598; 72/356, 358, 72/352, 377, 344; 310/257, 263

[56] References Cited

U.S. PATENT DOCUMENTS 3,271,604 11/1962 Priddy ........................... 29/598 UX
4,041,754 8/1977 Otani ...................................... 72/356

OTHER PUBLICATIONS

Melvin H. Verson, "The Ford Sandusky Project, Nov. 2, 3 and 4, 1965, pp. 8-10.

Primary Examiner—Howard N. Goldberg
Assistant Examiner—Timothy V. Eley
Attorney, Agent, or Firm—Kinzer, Plyer, Dorn & McEachran

[57] ABSTRACT

A method of manufacture of a magnetic rotor core member for a rotating-field dynamoelectric machine, particularly a small alternator, including the steps of: hot forging a segment of steel bar stock into a core blank approximating the external configuration desired for the rotor core member; de-burring the core blank; coining the core blank into closer conformation to the desired core member configuration; cooling the core blank; cold punching a shaft aperture through the central part of the core blank and simultaneously cold-compressing the core blank into closer conformity with the required dimensions for the finished rotor (or rough machining of a shaft aperture and rough machining of some elements of the blank); and, finally, cold-compressing the core blank to finished form as a rotor core member.

11 Claims, 12 Drawing Figures

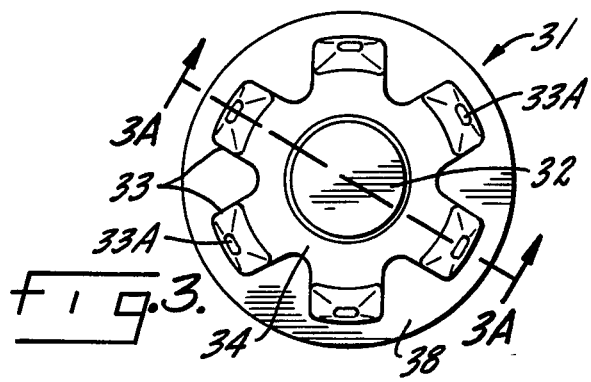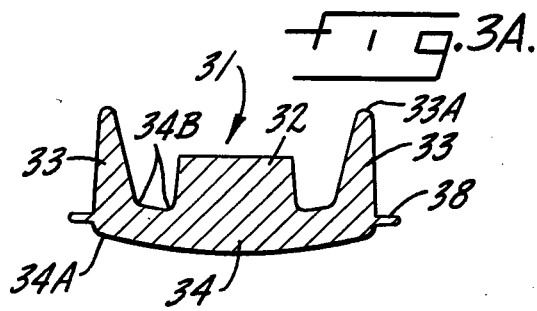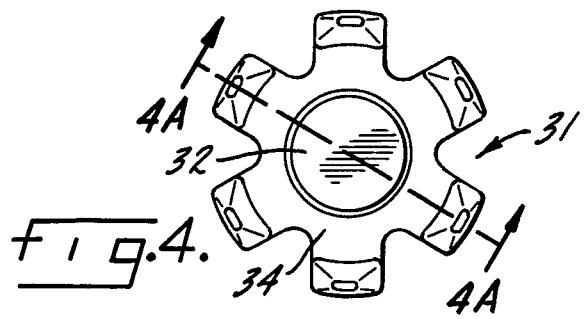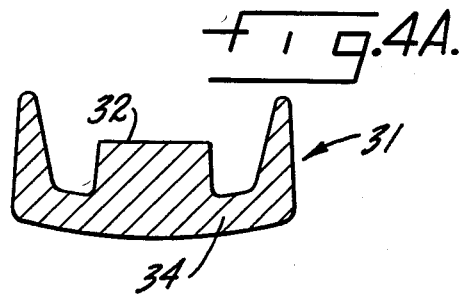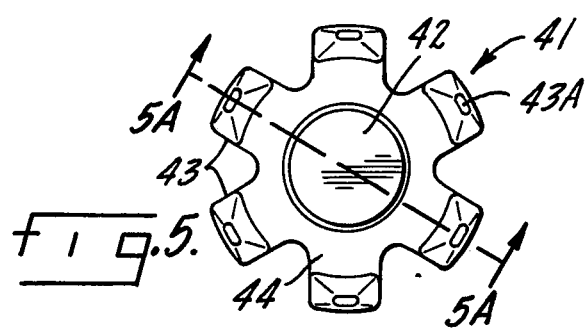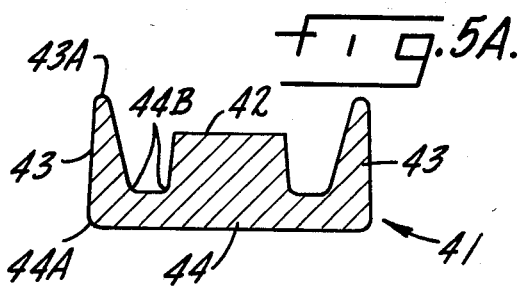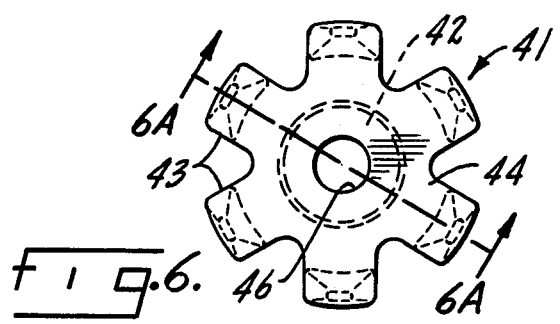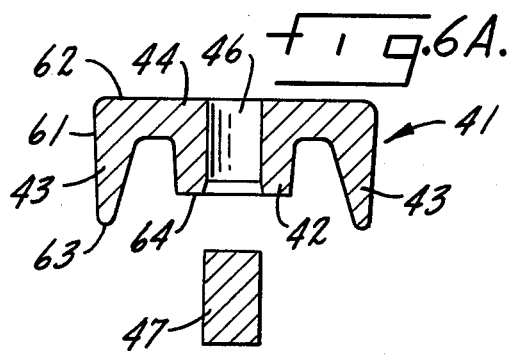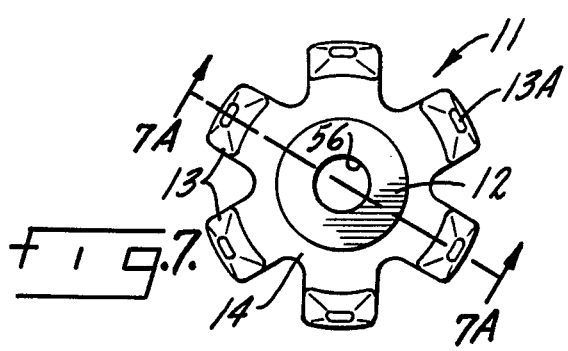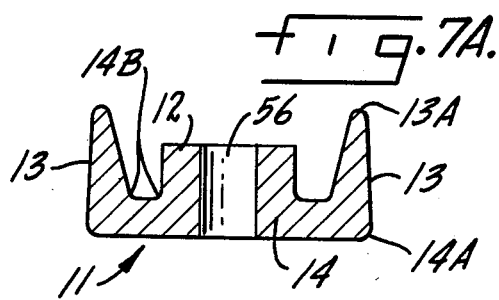

METHOD OF MANUFACTURE OF A MAGNETIC ROTOR CORE MEMBER FOR A ROTATING-FIELD DYNAMOELECTRIC MACHINE

BACKGROUND OF THE INVENTION

Automotive vehicles and small vessels use D.C. electrical power sources for operation of lights and controls; the traditional power source for these applications was a DC generator driven from the vehicle engine. More recently, with major improvements in rectifier technology, the DC generator has been replaced by the combination of a small alternator and a rectifier. The most practical and most widely used type of alternator employs a rotating field, using a magnetic core usually manufactured by a combination of forging and machining operations.

Thus, one traditional practice followed in manufacturing the magnetic core members used in rotating-field alternators intended for use in automotive vehicles and small vessels has begun with a segment of low-carbon steel bar stock, which is initially forged to a general approximation of the desired external configuration for a rotor core member. After the initial forging operations the resulting core blank is de-burred and then may be subjected to additional forging to obtain a closer approximation of the required configuration for the rotor core member. The core blank is then machined to cut a shaft-mounting aperture through the hub of the core blank and to finish a number of surfaces on the core blank, surfaces that require close tolerances. Finally, additional de-burring is usually required to complete the machining procedures.

Another traditional manufacturing process is a stamping method, in which a core blank is punched out of a segment of steel plate and mechanically bent to have a close approximation of the required configuration for the rotor core member, which then may be subjected to machining and deburring to obtain adequate dimensional precision. The present invention, however, is more closely related to the forging process described above.

The machining operations usually employed in the manufacture of a magnetic rotor core member constitute a major part of the cost of manufacture. Nevertheless, close-tolerance finish machining procedures have been considered essential to the manufacture of rotor core members of adequate quality. The same basic problems are presented in the manufacture of magnetic rotor core members for other dynamoelectric machines (e.g. motors) of similar type and size.

SUMMARY OF THE INVENTION

It is a primary object of the present invention, therefore, to provide a new and improved method of manufacture of a magnetic rotor core member for a rotating-field dynamoelectric machine, particularly an alternator, that effectively minimizes or eliminates any requirement for close-tolerance machining of the core member, utilizing forging, punching, and cold compression procedures in the production of a rotor core member having adequate dimensional precision.

It is a specific object of the invention to provide a new and improved method of manufacture of a magnetic rotor core member for a rotating-field dynamoelectric machine, particularly an alternator, that combines hot forging, coining, cold punching (or rough machining), and cold forging procedures to complete a finished rotor core member with minimum waste of core material and minimal energy consumption, and at minimal cost.

Accordingly, the invention relates to an improved method of manufacture of a magnetic rotor core member for a dynamoelectric machine of the rotating-field type, the rotor core member including a cylindrical hub section mountable upon a rotor shaft, an integral disc section extending radially outwardly from one end of the hub section, and a plurality of annularly spaced integral pole pieces projecting from the outer edge of the disc section in a direction parallel to the hub axis. The method comprises the following steps:

A. hot forging a segment of steel bar stock to form a preliminary core blank having a general approximation of the desired external configuration for the rotor core member;

B. coining the preliminary core blank to form a secondary core blank more closely approximating the desired external configuration for the rotor core member;

C. cooling the secondary core blank;

D. cold punching the central part of the secondary core blank to form a shaft aperture therethrough and, at the same time, cold-compressing the secondary core blank into closer conformity with the required precise configuration for the finished rotor core member;

E. cold compressing the secondary core blank, in a cold forming press, to final form and dimensions to complete a finished rotor core member that requires little or no close-tolerance finish machining.

Step D may be modified to constitute cold compressing the secondary core blank, rough machining of a shaft aperture, rough machining of a number of surfaces of the secondary core blank to uniformalize the volume of metal of such secondary core blanks as well as bring such surfaces into closer conformity with the required dimensions for the finished rotor core.

BRIEF DESCRIPTION OF THE DRAWINGS

FIGS. 3 through 7 are elevation views of a rotor core member at various stages in the method of manufacture of the present invention, all taken from the pole-piece side of the core member except for FIG. 6, which is taken from the opposite side; and FIGS. 3A through 7A are simplified sectional views taken approximately as indicated in FIGS. 3 through 7.

DESCRIPTION OF THE PREFERRED EMBODIMENTS

Figure 1:
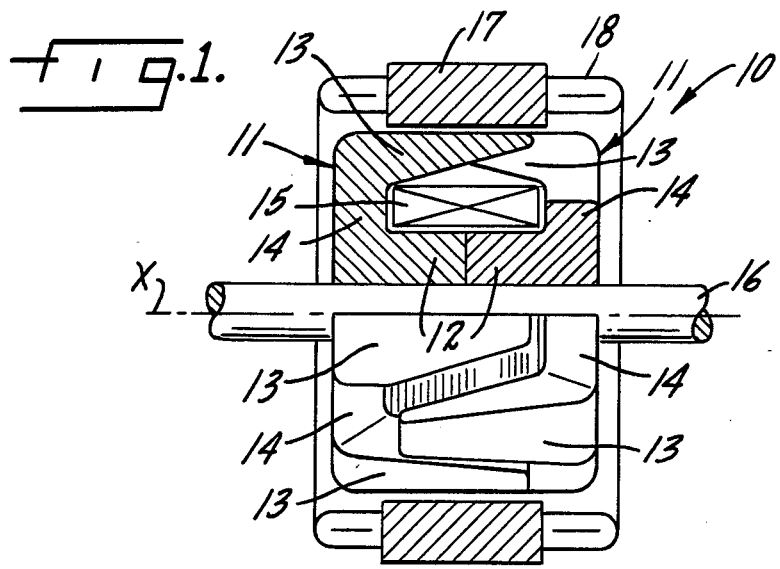
FIG. 1 is a simplified, partially schematic halfsectional elevation view of a rotating-field alternator incorporating magnetic rotor core members manufactured by the method of the present invention.

FIG. 1 illustrates a small alternator or other rotary dynamoelectric machine 10 of the rotating-field type; alternators using the construction illustrated for machine 10 are in common use in vehicles, small vessels, and other like applications. Alternator 10 includes a rotary magnetic core formed by two core members 11 which may be essentially identical in construction to each other. Thus, each rotor core member 11 includes a cylindrical hub section 12, an integral disc section 14 extending radially outwardly from one end of the hub section, and a plurality of integral pole pieces, angularly spaced from each other, that project from the outer edge of the disc section 14 in a direction parallel to the axis X of the hub section 12.

In alternator 10, the two rotor core members 11 are mounted on a shaft 16 that extends through the hub sections 12 of the core members, the orientation of the two core members being such that their pole pieces 13 are interleaved with each other. A field coil 15 is mounted in encompassing relation to the hub sections 12 of the two core members 11 to complete the rotor for alternator 10. An annular stator core 17 is disposed in encompassing relation to the rotor of alternator 10 and supports the usual stator coils 18 from which the output of the alternator is derived. In FIG. 1, the stator 17,18 has been shown in simplfied form because it is not relevant to the present invention.

Figure 2:
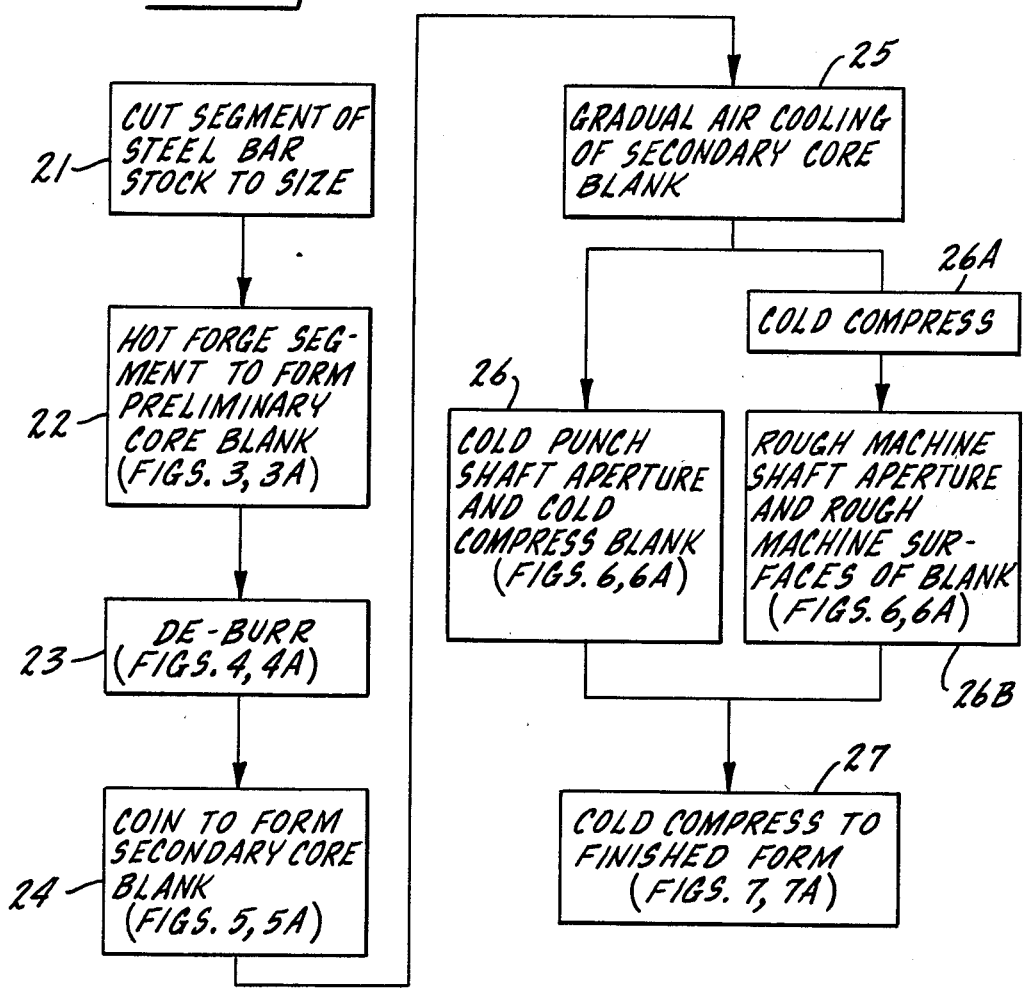
FIG. 2 is a flow chart illustrating the steps for the method of the invention.

FIG. 2 affords a flow chart of the steps involved in the method of manufacture of a rotor core member, such as one of the core members 11 of FIG. 1, according to the present invention. A number of intermediate stages of the process of FIG. 2 are illustrated in FIGS. 3–6 and FIGS. 3A–6A, culminating in a finished magnetic rotor core member 11 as shown in FIGS. 7 and 7A.

At the outset, in step 21 of the procedure illustrated in FIG. 2, a segment of steel bar stock that is to be shaped into a rotor core member is cut to size. A conventional cutting press can be utilized for step 21. The segment of steel bar stock should have relatively closely controlled dimensions to avoid excessive waste and to assure adequate performance of succeeding steps in the manufacturing procedure. The bar stock employed may vary considerably; it usually constitutes a low carbon steel and must afford adequate magnetic properties for the core of an alternator or other small dynamoelectric machine.

In the second step 22 of the manufacturing method illustrated in FIG. 2, the bar stock segment from step 21 is hot forged to form a preliminary core blank 31, shown in FIGS. 3 and 3A. The shape of the preliminary core blank 31 is a general approximation of the desired external configuration for the finished rotor core member 11 (FIGS. 1, 7 and 7A). Thus, core blank 31 includes a central hub section 32, but that hub section is still solid rather than cylindrical. A series of fingers 33 that are subequently to become the pole pieces 13 are formed by the initial hot forging procedure of step 22, fingers 33 being joined to the central section 32 by an integral disc section 34. Preferably, the corners and edges of various elements of the preliminary core blank 31 of FIGS. 3 and 3A, such as elements 33A, 34A, and 34B, are formed with definite radii, rather than sharp corners, for reasons discussed more fully below. At this stage, excess material in the original segment of steel bar stock produces a forging burr 38 around the periphery of core blank 31 and between fingers 33.

The next step 23 in the manufacturing procedure illustrated in FIG. 2 is de-burring of the preliminary core blank formed in the preceding step 22. No sophisticated process is involved. Conventional punching procedures are utilized to eliminate the forging fringe or burr 38 from core blank 31 (FIGS. 3 and 3A). De-burring produces the cleaned-up version of preliminary core blank 31 that is illustrated in FIGS. 4 and 4A.

The next step 24 in the manufacturing process, FIG. 2, is coining of the preliminary core blank formed in the preceding steps to produce a secondary core blank more closely approximating the desired external configuration for one of the rotor core members 11. Again, no sophisticated or special equipment is required. A conventional coining press is utilized, further shaping the core blank to the configuration illustrated for secondary core blank 41 in FIGS. 5 and 5A. In core blank 41, the central portion 42 is still solid. The disc section 44 has been flattened to a closer approximation of the required final form. The fingers 43 that are to form the pole pieces of the rotor core member are also shaped to a closer approximation of the final required configuration. Edges and corners, such as those identified at 43A, 44A, and 44B in FIGS. 5 and 5A, are coined to a close approximation of the final required shape, again with distinct radii rather than sharp corners.

In the next step 25 of the manufacturing procedure, FIG. 2, the secondary core blank 41 from step 24 (see FIGS. 5 and 5A) is gradually air cooled. Most simply and effectively, the secondary core blanks are left to cool from the red-hot condition in which they emerge from the coining press (step 24) until they cool off naturally. Gradual air cooling affords an effect which is comparable to annealing treatment, without the expense of special annealing procedures, with a resulting favorable effect on subsequent steps in the manufacturing process.

In the next step 26 of the manufacturing procedure, FIG. 2, the central portion of the center section 42 of secondary core blank 41 may be cold punched to produce a shaft-mounting aperture. Thus, as shown in FIG. 6A, an axial portion 47 is cold punched from the hub section 42 of core blank 41, forming an axial shaft aperture 46 in the core blank. At the same time, the press employed for the cold punching operation of step 26 is utilized for cold compression of the some elements of blank 41, including the finger portions 43, to bring such elements into closer conformity with the required configuration for the finished rotor core member.

The final step 27 in the manufacturing process, FIG. 2, is a second cold compression procedure, again carried out in a cold forming press, to achieve the final, finished shape for a rotor core member 11 as illustrated in FIGS. 7 and 7A. In most instances, a single cold compression step, such as that used in step 26, is inadequate to obtain the required finished dimensions for core member 11, within acceptable tolerances. This is the reason for the final cold compression step 27. Indeed, even one additional cold compression step 27 may be inadequate in this regard and a further cold forming procedure may be necessary or desirable for sufficient precision control of the dimensions of rotor core member 11.

The concluding cold forming procedure in the manufacturing method, step 27 in FIG. 2, provides the final finished configuration for all elements of the rotor core member, including hub 12 with its shaft mounting aperture 56, pole pieces 13, and the disc section 14 that joins the pole pieces to the hub. The edge or transition surfaces and corners are thus formed to precise configurations as illustrated in FIGS. 7 and 7A for surfaces and corners 13A, 14A, and 14B. The outer and inner walls of hub section 12, in particular, are formed to the precise dimensions required for fitting onto shaft 16 and for mounting of field coil 15 (FIG. 1).

The rounded shapes used at transition points and surfaces 13A, 14A, and 14B in rotor core element 11 are of substantial advantage in reducing requirements for subsequent machining, and have the further advantage of eliminating any need for de-burring following machining procedures. Furthermore, the presence of the corner radii, particularly on pole pieces 13, minimizes magnetic vibration of the core members as used in an alternator or like dynamoelectric machine 10 (FIG. 1), keeping magnetic noise to a minimum and affording some improvement in operational efficiency of the completed machine. In general, finish machining of core member 11 is unnecessary and the core member can be utilized as formed at the end of the process shown in FIG. 2; some limited specialized machining such as the cutting of a keyway into aperture 56 in hub 12 (FIG. 7A) may still be necessary. The combination of the hot forging step 22 and gradual air cooling step 25 in the process of FIG. 2 (the blank remains hot through steps 23 and 24) tends to homogenize the magnetic steel being worked, with the result that the cold forming processes of subsequent steps 26 and 27 require less force and energy than if cold processing were used throughout the manufacturing procedure.

In any forging operation it is essential to make certain that a uniform quantity of metal is contained within the forging dies, particularly in cold-forging operations. Generally, the uniformity in quantity of metal of the secondary core blanks provides ease of cold forging as well as a prolonged life of dies.

While the secondary core blank from step 25 generally offers a uniform quantity of metal, greater uniformity may in some cases be necessary depending on size, form, weight or combination thereof of a rotor core member to be produced.

In order to meet such a situation and also to maximize the effective life of the forging dies used in step 27 while retaining the major benefits of the method of the present invention, Step 26 in the process may be replaced by Steps 26A and 26B (FIG. 2). With this modification, the secondary core blank from step 25 is cold compressed in step 26A to facilitate the subsequent step of rough machining, after gradual air cooling in step 25, and then rough machined to cut the shaft aperture 46 into the blank, in step 26B, instead of cold punching that aperture as described in connection with step 26.

Referring to FIG. 6A, this means that the aperture 46 is formed by rough machining (drilling) and that there is no punched-out portion 47. In this modification of the invention, a number of surfaces of the blank may also be rough machined, in step 26B, into closer conformity with the required configuration and dimensions for the finished rotor core member. The volume is adjusted to suit subsequent cold compression operations in step 27. Typically, the rough machining of the secondary core blank in step 26B of the modified process may include the periphery 61, the base 62 of disc section 44, the tips 63 of fingers 43 and the surface 64 of the central portion (hub) 42.

By comparison with the machining process in connection with the traditional methods for manufacture of a rotor core member and which is employed to attain very high dimensional, finished accuracy, the rough machining discussed herein is a much simpler, much less time-consuming and much less sophisticated sort of machining and is principally intended to uniformalize and adjust volume of metal of the secondary core blank to suit the subsequent cold forging.

Whether using the cold punching and cold compressing step 26 or the cold compression and machining steps 26A and 26B, it should be noted that this stage of the operation is not intended to produce a final, finished configuration for the rotor core member. Final finishing is accomplished in the cold compression operation of the subequent step 27. In either embodiment of the invention, the final cold compression, step 27, is best accomplished in a two-step operation because, due to the intricate configuration of the core member, a single cold compression procedure may be inadequate to obtain the requisite precision for all surfaces. The oftener the piece is compressed, the better dimensional accuracy can be obtained.

I claim:

1. An improved method of manufacture of a magnetic rotor core member for a dynamoelectric machine of the rotating-field type, the rotor core member including a cylindrical hub section mountable on a rotor shaft, an integral disc section extending radially outwardly from one end of the hub section, and a plurality of annularly spaced integral pole pieces projecting from the outer edge of the disc section in a direction parallel to the hub axis, the method comprising the following steps:

A. hot forging a segment of steel bar stock to form a preliminary core blank having a general approximation of the desired external configuration for the rotor core member;

B. coining the preliminary core blank to form a secondary core blank more closely approximating the desired external configuration for the rotor core member;

C. cooling the secondary core blank;

D. cold punching the central part of the secondary core blank to form a shaft aperture therethrough and simultaneously cold compressing the secondary core blank into closer conformity with the required configuration for the rotor core member; and E. cold compressing the secondary core blank, in a cold forging press, to final form and dimensions to complete a finished rotor core member.

2. The method of manufacturing a magnetic rotor core member according to claim 1 in which step C is carried out by gradual air-cooling of the secondary core blank.

3. The method of manufacturing a magnetic rotor core member according to claim 2 in which cold compression of the secondary core blank in step E is carried out in at least two sequential cold compression operations.

4. The method of manufacturing a magnetic rotor core member according to claim 3 including the following additional step:

A'. de-burring the preliminary core blank after hot forging in step A and prior to coining in step B.

5. The method of manufacturing a magnetic rotor core member according to claim 3 in which steps A, B and E are carried out by means of dies which form rounded corners at the outer rims of the pole pieces and at the edges of the disc section.

6. An improved method of manufacture of a magnetic rotor core member for a dynamoelectric machine of the rotating-field type, the rotor core member including a cylindrical hub section mountable on a rotor shaft, an integral disc section extending radially outwardly from one end of the hub section, and a plurality of annularly spaced integral pole pieces projecting from the outer edge of the disc section in a direction parallel to the hub axis, the method comprising the following steps:

A. hot forging a segment of steel bar stock to form a preliminary core blank having a general approximation of the desired external configuration for the rotor core member;

B. coining the preliminary core blank to form a secondary core blank more closely approximating the desired external configuration for the rotor core member;

C. cooling the secondary core blank;

D. rough machining a shaft mounting aperture into the central part of the secondary core blank and rough machining elements of the secondary core blank into closer conformity with the required configuration for the rotor core member; and E. cold compressing the secondary core blank, in a cold forging press, to final form and dimensions to complete a finished rotor core member.

7. The method of manufacturing a magnetic rotor core member according to claim 6 in which step C is carried out by gradual air-cooling of the secondary core blank.

8. The method of manufacturing a magnetic rotor core member according to claim 7 in which cold compression of the secondary core blank in step E is carried out in at least two sequential cold compression operations.

9. The method of manufacturing a magnetic rotor core member according to claim 8 including the following additional step:

C'. preliminary cold compressing of the secondary core blank prior to the rough machining operations of step D.

10. The method of manufacturing a magnetic rotor core member according to claim 9 including the following additional step:

A'. de-burring the preliminary core blank after hot forging in step A and prior to coining in step B.

11. The method of manufacturing a magnetic rotor core member according to claim 10 in which steps A, B and E are carried out by means of dies which form rounded corners at the outer rims of the pole pieces and at the edges of the disc section.

* * * * *